United States Patent
Ribaud

(10) Patent No.: US 6,712,588 B1
(45) Date of Patent: Mar. 30, 2004

(54) TURBOMACHINE WITH A VANELESS ROTATING DIFFUSER AND NOZZLE

(75) Inventor: Yves Ribaud, Bonnelles (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 0 days.

(21) Appl. No.: 10/009,379

(22) PCT Filed: May 30, 2000

(86) PCT No.: PCT/FR00/01480

§ 371 (c)(1),
(2), (4) Date: Mar. 19, 2002

(87) PCT Pub. No.: WO00/75490

PCT Pub. Date: Dec. 14, 2000

(30) Foreign Application Priority Data

Jun. 3, 1999 (FR) .............................. 99 07002

(51) Int. Cl.[7] .............................. F04B 17/00; F01D 1/06
(52) U.S. Cl. .................... 417/407; 417/405; 415/224.5
(58) Field of Search ................. 417/405, 407; 415/224.5, 211.2, 202, 94, 95, 100

(56) References Cited

U.S. PATENT DOCUMENTS

| 2,904,307 | A | | 9/1959 | Balje et al. |
|---|---|---|---|---|
| 3,378,229 | A | | 4/1968 | Erwin |
| 3,460,748 | A | | 8/1969 | Erwin |
| 3,465,518 | A | | 9/1969 | Erwin |
| 3,868,196 | A | * | 2/1975 | Lown .......................... 415/146 |
| 3,984,193 | A | * | 10/1976 | Yu .............................. 415/228 |
| 4,586,878 | A | * | 5/1986 | Witchger .................... 417/407 |
| 4,843,813 | A | * | 7/1989 | Paul ......................... 60/39.162 |
| 5,323,612 | A | * | 6/1994 | Werner ....................... 60/605.1 |

FOREIGN PATENT DOCUMENTS

| CH | 41 650 | 11/1908 |
|---|---|---|
| DE | 232 348 | 12/1909 |
| FR | 1 124 752 | 10/1956 |

* cited by examiner

Primary Examiner—Justine R. Yu
Assistant Examiner—Timothy P. Solak
(74) Attorney, Agent, or Firm—Sturm & Fix LLP

(57) ABSTRACT

A radial turbine with a novel inlet and a outlet is combined with a centrifugal compressor, also having novel inlet and outlet, so as to obtain a turbocompressor unit wherein the respective inlets and/or exhausts of which are improved. The combination of above improves the overall efficiency of the turbocompressor unit. In addition, the combination limits the axial bulk of such a unit at the cost of a limited increase both in the cross section and the weight and structural complexity of the turbocompressor unit. Such a turbomachine: a radial turbine with an optional centrifugal compressor can be produced using two-microelectronic dimensional machining techniques of the microelectronic type.

16 Claims, 2 Drawing Sheets

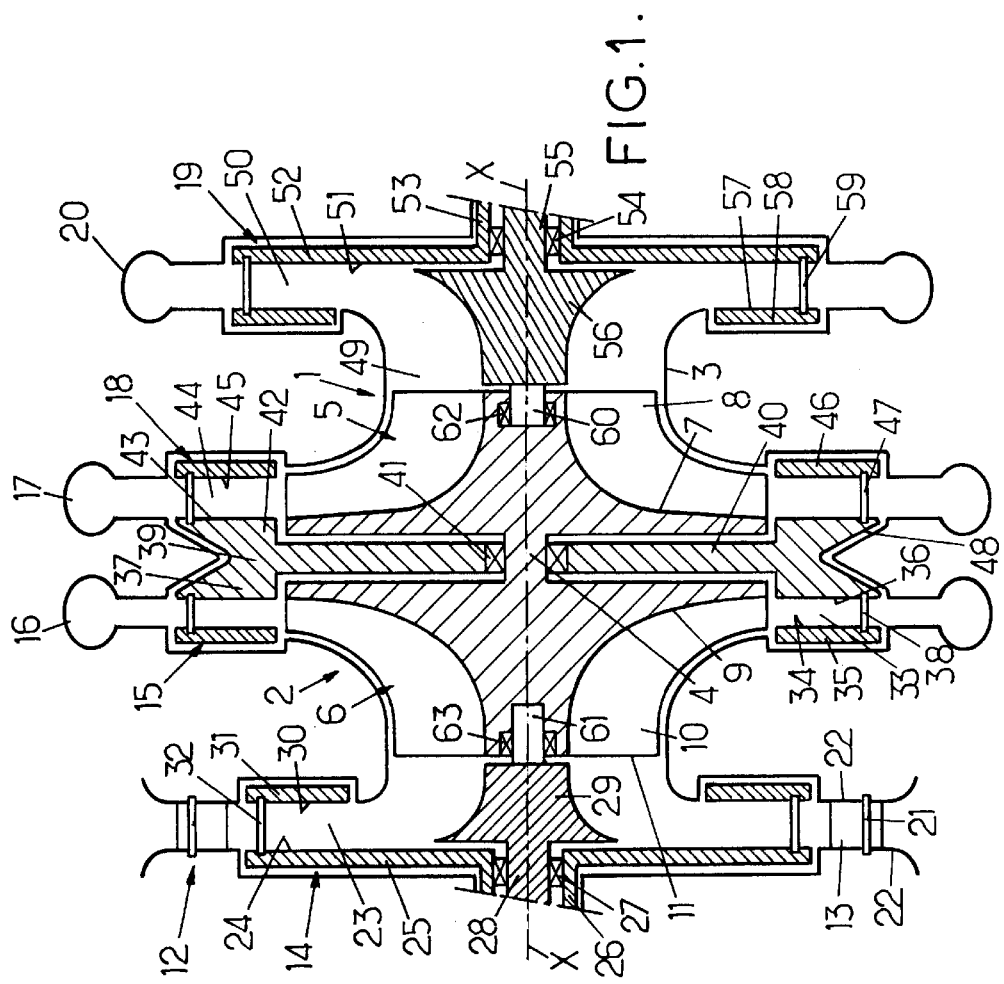

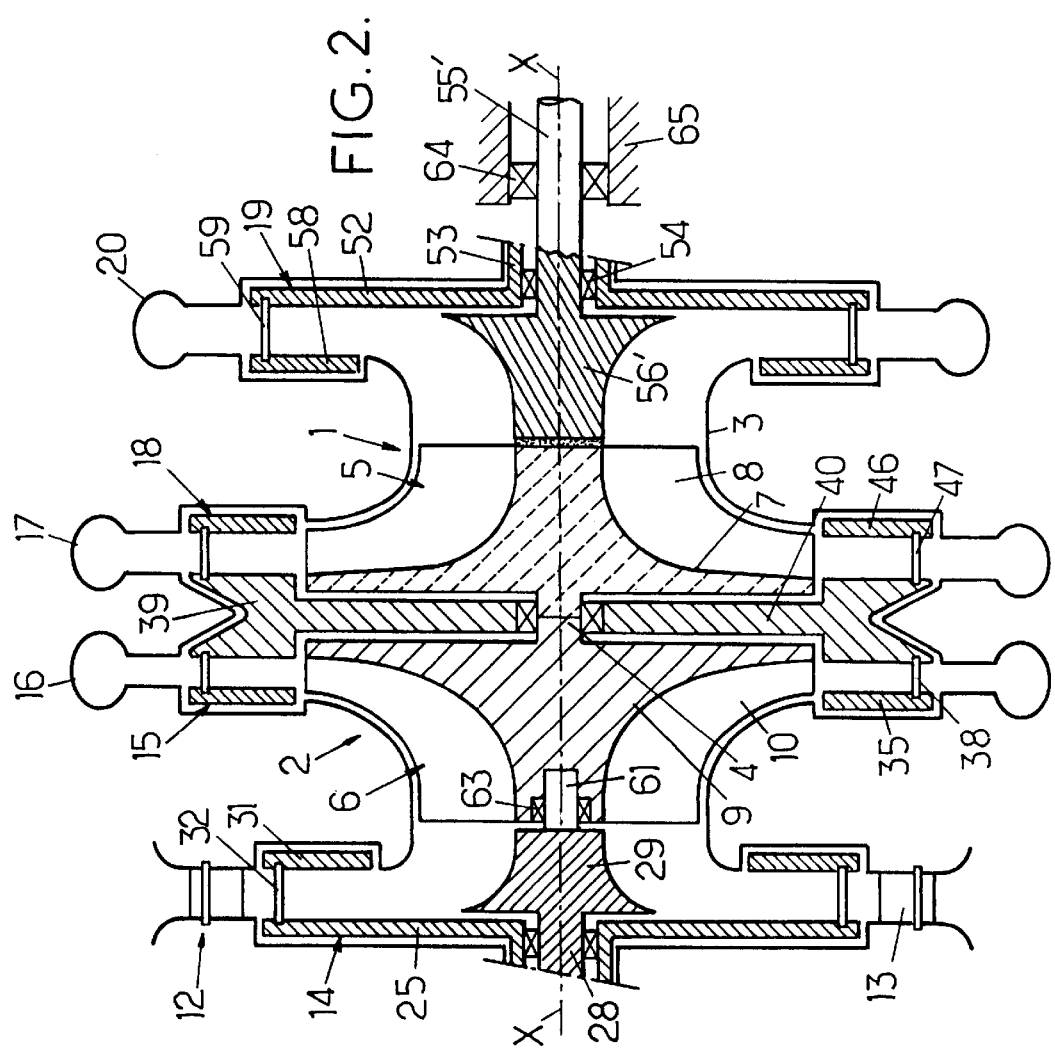

TURBOMACHINE WITH A VANELESS ROTATING DIFFUSER AND NOZZLE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to improvements made to radial turbomachines of the type comprising at least one centripetal radial turbine comprising a rotor mounted to rotate in a casing about an axis of rotation, the rotor comprising a disk that can rotate about its axis which is coincident with the axis of rotation, and in which a face of the disk facing in the downstream direction with respect to the direction of flow of a fluid let into the turbine is fitted with blades.

2. Background Art

Centripetal radial and radial-axial turbines of the state of the art generally comprise, from the upstream to the downstream end, an inlet volute, a plain (that is to say unbladed) nozzle with fixed walls, followed by a bladed centripetal radial rotor or a radial-axial rotor when the stream flowing through the rotor changes from the radial direction to the axial direction, and finally a plain and generally axial oriented exhaust diffuser.

In a configuration of such a turbine with a low cross section, according to a known alternative form, the turbine has no inlet volute, and inlet is via an axial-centripetal radial duct of revolution about the axis of rotation. According to another known alternative form, a bladed nozzle is arranged between the inlet volute or the axial-radial inlet duct and the plain nozzle.

Furthermore, the rotor disk, in the inlet region, has significant notches or apertures between the blades, and this makes it possible to reduce the stresses in the rotor and its inertia.

These known centripetal radial and radial-axial turbines have the following disadvantages: their plain nozzle has a radius ratio (outside radius/inside radius) generally higher than 1.1, so as to limit the erosion of the trailing edges of the blades of the bladed nozzle, this erosion being due to the centrifuging of particles. In the absence of a bladed nozzle, the radius ratio of the plain nozzle is very high, because this radius ratio governs the acceleration of the fluid. As the speed of the fluid leaving the plain nozzle is high, the length of the stream lines is long, the coefficient of friction is not insignificant, and the hydraulic diameter small, this means that losses of stagnation pressure by viscosity may be significant in the plain nozzle.

Furthermore, in the rotor and more specifically at the notches thereof, the frictional losses are once again not insignificant, because the friction rate to be considered is the rate of flow with respect to the fixed casing, that is to say a rate similar to the rate at which the rotor rotates.

Finally, at the exhaust, and more specifically in the case of non-optimum operation (away from the nominal point), the axial exhaust diffuser does not allow the tangential kinetic energy to be converted into pressure. This is rendered possible by the use of a radial exhaust diffuser with fixed walls. However, in the latter instance, the tangential friction greatly diminishes the pressure gains that could theoretically be achieved by the use of such a component.

BRIEF SUMMARY OF THE INVENTION

One object of the invention is to improve the overall efficiency of this type of turbomachine by improving their inlet and, preferably also, or alternatively, their exhaust.

Another object of the invention is to combine, within such a radial turbomachine, a centrifugal compressor with the centripetal turbine according to the invention so as to obtain a turbocompressor unit the respective inlets and/or exhausts of which are perfected, so as to improve the overall efficiency of the turbocompressor unit thus obtained by comparison with similar units of the state of the art, and in particular by limiting the axial bulk of such a unit at the cost of a limited increase both in the cross section and the weight and structural complexity of such a turbocompressor unit.

Yet another object of the invention is to propose a turbomachine with a centripetal radial turbine and, possibly, centrifugal radial compressor, which can be produced by using two-dimensional machining techniques, of the microelectronic type.

The field of application at which the invention is targeted relates essentially to the microturbines, particularly of the type used for producing auxiliary power units for aircraft or for propelling unmanned aerial vehicles, such as microdrones.

To this end, the invention proposes a turbomachine comprising at least one centripetal radial turbine of the type set out hereinabove, and which is characterized in that the centripetal turbine is supplied with fluid by a plain radial inlet nozzle rotating freely and coaxially with respect to the turbine rotor and surrounding the turbine rotor.

One essential advantage afforded by the plain freely rotating radial nozzle is that it makes it possible to very significantly reduce the losses through friction on the walls of this member because the kinetic energy of the fluid in the movement associated with the walls is practically quartered. In the same way, at the apertures in the rotor, the presence of the rotary disk of the nozzle makes it possible to reduce the losses through friction of the fluid against the fixed casing, because the kinetic energy of the fluid in the movement associated with the walls is also quartered.

To improve performance, the turbomachine of the invention also and advantageously comprises at least one centrifugal radial compressor comprising a rotor coaxial with the turbine rotor and rotating as one with the turbine rotor about the axis of rotation in the casing, the compressor rotor comprising a rotary disk coaxial with the turbine rotor disk and of which a face facing in the upstream direction with respect to the direction of flow of a fluid let into the compressor is equipped with blades compressing the fluid toward a plain radial exhaust diffuser rotating freely and coaxially with respect to the plain and freely rotating radial turbine inlet nozzle, the compressor exhaust diffuser surrounding the compressor rotor and being surrounded by a fluid flow uptake volute in communication with a fluid inlet volute surrounding the turbine inlet nozzle, for supplying the latter through said inlet nozzle.

The function of the compressor plain radial exhaust diffuser is to convert some of the kinetic energy acquired by the fluid leaving the compressor wheel into a pressure increase, because of the increase in the radius or distance between the point in question and the axis of rotation of the machine, and because of the conservation of momentum, give or take the friction on the walls, this friction being reduced because this plain radial diffuser is mounted so that it can rotate freely. The presence of moving walls, both for the centrifugal compressor plain radial exhaust diffuser and for the centripetal turbine plain radial inlet nozzle makes it possible to appreciably reduce the aerodynamic losses through friction between fluid and walls in the two plain radial ducts passing one through the nozzle and the other through the diffuser, these aerodynamic losses being associated with the fact that there is significant momentum both on the compressor side and on the turbine side.

Advantageously, to improve the compactness and simplify the structure of the machine, and to further reduce the aerodynamic losses, the compressor plain radial exhaust diffuser and the turbine plain radial inlet nozzle are arranged as a single assembly free to rotate coaxially with respect to the turbine and compressor rotors.

In this architecture, it is advantageous for the freely rotating assembly to comprise an intermediate disk mounted so that it is free to rotate, between the turbine and compressor rotor disks, about a common main shaft connecting together the turbine and compressor rotor disks so that they rotate as one about the axis of rotation. Thus frictional losses at the rotor disks are also reduced because the intermediate disk is set in rotation between the turbine and compressor rotor disks.

In an advantageously simple and effective structural embodiment, the compressor plain and freely rotating radial exhaust diffuser has, passing through it, a radial duct delimited between two plain walls facing one another and of revolution about the axis of rotation, and of which one is a wall of a downstream disk coaxial with the compressor rotor and free to rotate about the axis of rotation independently of the compressor rotor, the other wall of the duct being a wall of an upstream annular ring coaxial with the compressor rotor and secured to the downstream disk of said exhaust diffuser so that it rotates as one therewith, by substantially axial spacer pieces in a substantially radially external position, with respect to the axis of rotation, on said upstream annular ring and on said downstream disk.

This structure, known per se, of a centrifugal compressor and of its plain radial exhaust diffuser rotating freely about the axis of rotation of the compressor rotor can be read across to the production of the centripetal turbine and of its plain radial inlet nozzle rotating freely about the axis of rotation of the turbine rotor, in a turbomachine according to the invention, to further improve the overall efficiency thereof.

As a result, according to the invention, the turbine plain and freely rotating radial inlet nozzle advantageously has, passing through it, a radial duct delimited between two plain walls facing one another and of revolution about the axis of rotation, and of which one is a wall of an upstream disk coaxial with the turbine rotor and free to rotate about the axis of rotation independently of the turbine rotor, the other wall of the duct being a wall of a downstream annular ring coaxial with the turbine rotor and secured to the upstream disk of said inlet nozzle so that it rotates as one therewith, by substantially axial spacer pieces in a substantially radially external position, with respect to the axis of rotation, on said downstream annular ring and on said upstream disk.

Thus, in the case of the compressor diffuser and in the case of the turbine nozzle, the moving equipment that is free to rotate and which consists of an annular ring, of a corresponding disk and of the spacer pieces which join them together so that they rotate as one, adopts a rotational speed corresponding to equilibrium between a driving torque, associated with the driving by the fluid in the radial duct of the exhaust diffuser or of the inlet nozzle and by the fluid trapped between the walls of the disk of the moving equipment in question, and of the corresponding compressor or turbine rotor disk, and a resistive torque which is due to the braking action exerted by the fluid trapped between the corresponding annular ring and the wall facing it belonging to the fixed casing of the machine.

Advantageously, when the architecture with a freely rotating disk secured by spacer pieces to an annular ring as specified hereinabove is adopted for the compressor exhaust diffuser and for the turbine inlet nozzle, it is advantageous for the freely rotating upstream disk of the turbine plain radial inlet nozzle and the freely rotating downstream disk of the compressor plain radial exhaust diffuser to rotate as one with the intermediate disk of the freely rotating assembly, and to be preferably of one single piece with said intermediate disk. The aerodynamic losses through friction between fluid and walls are thus further reduced while at the same time improving the compactness of the machine and reducing the number of its constituent parts, which constitutes a saving.

In order to further improve the overall efficiency of the machine, at the turbine, which may or may not collaborate with a centrifugal compressor, a fixed bladed nozzle may surround the turbine plain and freely rotating radial inlet nozzle and may itself be surrounded by the turbine inlet peripheral volute. If the turbomachine comprises a centrifugal compressor the rotor of which rotates as one with the rotor of the centripetal turbine, the overall efficiency of the machine can be further improved, at the compressor, using a fixed bladed diffuser which surrounds the compressor plain and freely rotating radial exhaust diffuser and which is itself surrounded by the fluid flow uptake peripheral volute.

According to another aspect of the invention, whether or not the turbomachine comprises a centrifugal compressor, the rotor of the centripetal turbine advantageously delivers the fluid flowing through said turbine to a plain and freely rotating radial exhaust diffuser rotating coaxially with respect to the turbine rotor in the casing.

Advantageously, this turbine plain radial and freely rotating exhaust diffuser may have the same overall architecture as the compressor plain radial and freely rotating exhaust diffuser and as the turbine plain and freely rotating radial inlet nozzle, as were defined hereinabove. In this case, the turbine plain and freely rotating radial exhaust diffuser also has, passing through it, a radial duct delimited between two plain walls facing each other and of revolution about the axis of rotation, of which one is a wall of a downstream disk coaxial with the turbine rotor and mounted so that it is free to rotate independently of the turbine rotor about the axis of rotation, for example, rotating as one with a tubular secondary shaft, guided in rotation by at least one bearing about a coaxial hub of the turbine exhaust diffuser, the other wall of the duct being a wall of an upstream annular ring coaxial with the turbine rotor and being secured to the freely rotating downstream disk of said turbine exhaust diffuser so as to rotate as one therewith by substantially axial spacer pieces and in a substantially radially external position on said upstream annular ring and said downstream disk of said turbine exhaust diffuser.

Although a plain and freely rotating radial nozzle is more difficult to produce than a plain and fixed axial exhaust nozzle, and requires in addition fluid flow to be taken up by a peripheral volute surrounding the plain and freely rotating radial nozzle, the fitting of the latter to the exhaust of a centripetal turbine does, by comparison with the fitting of a plain and fixed axial diffuser onto the exhaust of a centripetal turbine as is known in the state of the art, afford the advantages of allowing, apart from a saving on the axial bulk, a lowering of the tangential speed in the downstream direction, and therefore an increase in the static pressure which is greater than the one observed in an axial diffuser, which means in particular that the torque on the turbine shaft, during a start-up phase is higher, and the response time is shortened. The turbine radial exhaust diffuser therefore makes it possible to recuperate a higher proportion of the kinetic energy of the fluid than is possible with an axial diffuser, this making it possible to increase the efficiency of the turbine and obtain greater power on the shaft thereof. Furthermore, the reduction in the tangential speed in a turbine plain radial exhaust diffuser, followed by the recuperation of the fluid by a peripheral volute, has the significant advantage of leading to a quiet exhaust, unlike the situation encountered with a plain axial diffuser in which the concentration of a swirling flow near to the axis of rotation of the machine leads to there being, in this region, a core of "dead" fluid and unsteady phenomena which are due to a shear between the "dead" fluid and the "healthy" fluid, which is why there is a not insignificant noise level.

According to the invention, mounting the turbine plain radial exhaust diffuser so that it is free to rotate further increases the qualities of the machine, because of the reduction in the friction between the fluid and the walls of this diffuser, which means that the efficiency and the power of the centripetal turbine increase still further in non-optimized operation, particularly upon start-up, and that the noise level drops further, this being due to the lowering of the level of turbulence in the diffuser.

When the machine comprises a centrifugal compressor, as explained hereinabove, the overall efficiency is further improved by supplying the compressor with fluid through a plain radial nozzle rotating freely coaxially with respect to the compressor rotor, inside the casing.

In practical terms, this compressor plain and freely rotating radial inlet nozzle may be produced with the overall architecture of the centripetal turbine radial inlet nozzle and centripetal turbine and centrifugal compressor radial exhaust diffusers as were explained hereinabove. In particular, the compressor plain and freely rotating radial inlet nozzle may have, passing through it, a radial duct delimited between two plain walls facing each other and of revolution about the axis of rotation, of which one is a wall of an upstream disk coaxial with the compressor rotor and mounted so that it is free to rotate independently of the compressor rotor about the axis of rotation, for example, rotating as one with a tubular tertiary shaft, guided in rotation by at least one bearing about a coaxial hub of said compressor inlet nozzle, the other wall of the duct being a wall of a downstream annular ring coaxial with the compressor rotor and being secured to the freely rotating upstream disk of the compressor inlet nozzle so as to rotate as one therewith by substantially axial spacer pieces and in a substantially radially external position on said downstream annular ring and said upstream disk of said compressor inlet nozzle.

This plain and freely rotating radial nozzle for supplying the compressor is set in rotation because of the frictional torque due to there being momentum in the fluid passing through this radial nozzle, the equilibrium rotational speed of which is obtained for equilibrium between the above-mentioned driving frictional torque and a resistive frictional torque created by the fluid trapped between the faces facing each other belonging to the upstream disk and to the downstream annular ring of this nozzle, on the one hand, and the casing, on the other hand. The free rotation of this plain radial nozzle makes it possible to reduce the aerodynamic losses in this region of the machine.

Advantageously also, this plain and freely rotating radial nozzle for supplying the compressor is surrounded by a fixed radial nozzle with orientable or variable-pitch blades which can be adjusted when there is a desire to vary the flow rate and the compression ratio of the machine, particularly in the case of air-conditioning compressors and those used for refrigeration. Indeed it should be noted that the centrifugal compressor as defined hereinabove, preferably with its plain and freely rotating radial exhaust diffuser and a peripheral volute for taking up the flow of fluid, possibly with the interposition of a bladed fixed radial diffuser surrounded by this volute and surrounding the plain and freely rotating radial diffuser and with a compressor plain and freely rotating radial inlet nozzle, possibly preceded by a fixed radial nozzle with orientable blades surrounding the plain and freely rotating radial nozzle, constitutes a centrifugal compressor that can be used in isolation, independently of any centripetal turbine, and which has a novel structure by comparison with the centrifugal compressors of the state of the art and affords particularly appreciable advantages over the latter. Such a centrifugal compressor as defined hereinabove therefore in itself constitutes an invention.

When the turbomachine is a turbocompressor with a turbine plain freely rotating radial exhaust diffuser and with a compressor plain and freely rotating radial inlet nozzle, the turbine and compressor rotors can rotate as one with one another on coaxial journals about the axis of rotation and between the hubs of the turbine plain radial exhaust diffuser and the compressor plain radial inlet nozzle. However, in the case of an arrangement as a gas turbine, in which power output is required from the turbine shaft, the turbine and compressor rotors can rotate as one with the hub of the turbine free radial exhaust diffuser, said diffuser hub being mounted so that it can rotate coaxially about the axis of rotation in the casing via at least one additional bearing, while the turbine and compressor rotors and the turbine plain radial exhaust diffuser rotary hub are mounted so that they rotate on the fixed hub of the compressor plain radial inlet nozzle via, for example, a journal coaxial with the axis of rotation.

Other features and advantages of the invention will become apparent from the description given hereinbelow of some non-limiting exemplary embodiments described with reference to the appended drawings.

BRIEF DESCRIPTION OF THE SEVERAL
VIEWS OF THE DRAWINGS

FIG. 1 is a schematic view in axial section of a turbocompressor with plain and freely rotating radial exhaust diffusers and inlet nozzles both for the turbine and for the compressor, FIG. 1a is a schematic view in cross section of a detail of a fixed radial nozzle with orientable blades of the turbocompressor of FIG. 1, and FIG. 2 is a view similar to FIG. 1 of a turbomachine of the same kind operating as a gas turbine.

DETAILED DESCRIPTION OF THE
INVENTION

The radial turbomachine of FIG. 1 is a turbocompressor combining a centripetal radial turbine 1 and a centrifugal radial compressor 2 in the same casing denoted in its entirety as 3. The centrifugal compressor 2, upstream of the centripetal turbine 1 with respect to the direction of flow of the fluids passing through the compressor 2 and the turbine 1 (from the upstream end, to the left in FIG. 1, to the downstream end, to the right in FIG. 1), is mechanically coupled to the centripetal turbine 1 by a main shaft 4 to which the rotors 5 and 6 of the turbine 1 and of the compressor 2 respectively are connected so that they rotate as one therewith. These rotors 5 and 6 are coaxial about their common axis of rotation X-X, which is the axis of the main shaft 4 and the longitudinal axis of the machine. The turbine rotor 5 comprises a main disk or centripetal wheel 7, of which the face facing in the downstream direction is fitted with blades 8, and which has symmetry of revolution about its axis coincident with the axis of rotation X-X.

Similarly, the compressor rotor 6 comprises a main disk or centrifugal wheel 9, of which the face facing in the upstream direction is fitted with compressor blades 10 and which has symmetry of revolution about its axis coincident with the axis of rotation X-X. The two rotors 5 and 6 are secured together so that they rotate as one about the axis X-X by their wheels 7 and 9 which are secured by their hub to the main shaft 4.

In a known way, the blades 10 of the centrifugal rotor 6 transfer energy between this rotor 6 and the fluid let into the compressor 2, which may be qualified as an axial-centrifugal rotor when the line of the leading edges 11 of the rotor blades 10 begins in an axial part of the fluid flow duct in the casing 3.

Also in a known manner, the blades 8 of the centripetal rotor 5 transfer energy between the fluid passing through the turbine 1 and the rotor 5 thereof.

The centrifugal compressor 2 is directly associated with inlet means and exhaust means, which are essentially housed in the casing 3 and which comprise, from the upstream end in the downstream direction, in the case of the inlet means, a fixed radial nozzle 12 with orientable blades or fins 13 (see FIG. 1a) and, a rotating and free plain radial nozzle 14 and, in the case of the compressor 2 exhaust, a rotating and free plain radial diffuser 15, possibly followed by a bladed fixed radial diffuser (not depicted) and a flow uptake peripheral volute 16 or section. The fixed radial nozzle 12 surrounds the plain and freely rotating radial nozzle 14 just as the freely rotating plain radial diffuser 15 surrounds the compressor rotor 6, being itself surrounded by the peripheral volute 16, possibly with interposition of the bladed fixed radial diffuser (not depicted) which, when present, surrounds the diffuser 15, while at the same time being surrounded by the peripheral volute 16.

Similarly, the centripetal turbine 1 is associated directly with inlet means and with exhaust means which are essentially housed in the casing 3 and which comprise, from the upstream end downstream, and in the case of the inlet means, a volute 17 for supplying the turbine 1 with fluid, this volute 17 being in communication with the volute 16 for taking up the flow of fluid leaving the compressor 2 for example via a combustion chamber through which a fuel is injected into an oxidizing gas, such as air, compressed by the compressor 2 and in such a way that the combustion gases are collected in the volute 17 to feed into the turbine 1, the inlet means of which also comprise a plain and freely rotating radial nozzle 18 which surrounds the turbine rotor 5 and is itself surrounded by the peripheral inlet volute 17, with the possible interposition of a bladed fixed radial nozzle (not depicted) between the inlet volute 17 and the nozzle 18, which is then surrounded by this bladed fixed nozzle itself surrounded by the peripheral volute 17. In the case of the exhaust means, the turbine 1 is associated with a plain and freely rotating radial diffuser 19 and with a peripheral outlet volute 20 collecting the fluids leaving the radial turbomachine, and surrounding the diffuser 19.

The plain and freely rotating radial diffusers 15 and 19 at the compressor 2 and turbine 1 exhaust respectively, and the plain and freely rotating radial inlet nozzles 14 and 18 of the compressor 2 and of the turbine 1 respectively are all coaxial about the axis of rotation X-X and mounted so that they can rotate freely about this axis X-X. As a result, the plain and freely rotating radial nozzles 14 and 18 and diffusers 15 and 19 associated, on the one hand with the compressor 2, and, on the other, with the turbine 1, are therefore coaxial with the compressor rotor 6 and with the turbine rotor 5 about this axis X-X and able to rotate about this same axis independently of the corresponding rotor 6 or 5.

Considering more specifically the structure and operation of the turbocompressor from the upstream end downstream, the fixed radial nozzle 12 with orientable blades 13 allows the flow rate and the compression ratio to be varied. The blades 13 of this fixed nozzle 12 are of variable pitch, each being variable about an axis 21 parallel to the axis X-X, in an annular duct coaxial around the axis X-X and delimited between two walls 22 of the casing 3 which are of revolution about the axis X-X and frustoconical, or plane and radial as in FIG. 1, and fixed downstream of a convergent section formed by the outer radial edges of these walls 22.

By comparison with a bladed nozzle with an axial duct, the radial nozzle 12 with orientable blades 13 has the advantage of requiring only two-dimensional blades 13 and plane duct walls 22, whereas the blades of a nozzle with an axial duct have a three-dimensional geometry and are mounted between toroidal walls of the duct so as to minimize leaks between the blade tips and the parts of the casing facing them. For a given angular pitch of the blades 13, the fixed nozzle 12 makes it possible to obtain momentum the intensity of which determines the performance of the compressor 2, for a given rotational speed of the rotor 6 of this compressor and a fixed permeability of the fluid circuit downstream of the rotor 6. To minimize aerodynamic losses and therefore improve the efficiency and compression ratio of the compressor 2, the fixed nozzle 12, the blades 13 of which are uniformly distributed (see FIG. 1f) in the circumferential direction, is advantageously arranged at the highest possible radius about the axis X-X compatible with the maximum desired cross section for the turbocompressor so that the level of the rate of flow of the fluid entering the turbomachine is low in this nozzle 12.

Downstream of the cascade formed by the orientable blades 13 of the fixed nozzle 12, the fluid then enters the plain and freely rotating radial nozzle 14, of which the architecture now described is very similar to that of the other plain and freely rotating radial nozzle 18 and plain and freely rotating radial diffusers 15 and 19.

In the nozzle 14, the fluid passes through a radial annular duct 23 delimited between two plain walls facing one another and of revolution about the axis of rotation X-X. These two plain walls, which have no blades, may be frustoconical or, as in FIG. 1, may be plane and radial, one of which 24 is the wall facing in the downstream direction on a main or upstream disk 25 of the nozzle 14, this annular disk 25 being coaxial with the compressor rotor 6 and secured, so that it rotates as one therewith, by its internal (with respect to the axis of rotation X-X) radial periphery, to a tubular shaft 26 coaxial with the main shaft 4 but independent thereof and mounted so that it can rotate freely, coaxially about the axis of rotation X-X, in a lateral extension of the casing 3, on bearings such as 27, which are rolling bearings, just one of which is depicted in FIG. 1, and mounted in the tubular shaft 26 and around the spindle 28 of a fixed hub 29 of the nozzle 14. This hub 29 and its spindle 28 are also of revolution about the axis of rotation X-X, and the hub 29 has an external lateral surface with the concave side facing radially outward and toward the blades 10 of the compressor rotor 6 so as to delimit the internal radial face of the duct through which fluid flows between the nozzle 14 and the compressor 2, and substantially in the continuation of the hub of the disk 9 of the compressor rotor 6 and of the wall 24 of the disk 25 of the nozzle 14.

The other plain and radial wall delimiting the duct 23 is the wall 30 facing in the upstream direction on an annular ring 31 of revolution about the axis of rotation X-X and therefore coaxial with the rotor 6, and in a corresponding annular and radial chamber of the casing 3. The annular ring 31 is secured to, in order to rotate as one with, the disk 25 facing it by spacer pieces 32 which are substantially parallel to the axis X-X and uniformly distributed in the circumferential direction about this axis, these spacer pieces 32 being in an external radial position on the ring 31 and the disk 25, that is to say arranged near the external periphery of the duct 23, where the speed of the fluid is at the lowest level, these spacer pieces 32 possibly also being profiled so as to reduce their aerodynamic drag in the relative motion so as to optimize for a given operating point.

In this plain and radial nozzle 14, the annular ring 31 and the main disk 25, secured together so that they rotate freely as one about the axis X-X, are set in rotation because of the frictional torque due to there being momentum supplied to the fluid by the bladed nozzle 12. The equilibrium rate of rotation of the ring 31 and of the disk 25 is obtained when the aforementioned driving torque is in equilibrium with the resistive torque created by the fluid trapped between internal faces of the casing 3 and the faces of the ring 31 and of the disk 25 which face them and near said internal and fixed faces of the casing 3. Setting the ring 31 and the disk 25 of the plain radial nozzle 14 in rotation makes it possible to minimize the aerodynamic losses in this region, these losses being reduced to about one third at the speed of free rotation of the diffuser 14, by comparison with a plain and fixed radial diffuser.

Having passed through the nozzle 14, the fluid is compressed in the centrifugal compressor 2 and transmitted to the exhaust diffuser 15, which is a plain and freely rotating radial diffuser, whose arrangement downstream of a centrifugal compressor is known per se, to convert some of the kinetic energy acquired by the fluid into a pressure rise both because of the conservation of momentum (give or take the friction on the plain walls of this diffuser 15) and because of the increase in the radius or distance between the point considered and the axis of rotation X-X. The continued conversion of kinetic energy into a pressure rise takes place in the bladed diffuser, downstream of the diffuser 15, when such a bladed diffuser is provided between the diffuser 15 and the volute 16, in which volute the fluid is then collected tangentially.

The compressor plain radial exhaust diffuser 15 has passing through it an annular and radial duct 33 delimited between two plain walls, with no blades, facing one another and of revolution about the axis of rotation X-X, it being possible for these plain walls to be frustoconical or, as depicted in FIG. 1, plane and radial walls, one 34 of which is a wall facing in the downstream direction, on an upstream annular ring 35 coaxial with the compressor rotor 6 and housed in a chamber of corresponding shape belonging to the casing 3, about this compressor rotor 6. The other wall of the duct 33 is a wall 36 facing in the upstream direction on a downstream disk 37 which is also coaxial with the compressor rotor 6 and free to rotate about the axis of rotation X-X independently of this compressor rotor 6. The annular ring 35 is secured to the disk 37 so that it rotates as one therewith by spacer pieces 38 similar to the spacer pieces 32 and therefore substantially axial, distributed uniformly in the circumferential direction about the axis X-X and aerodynamically profiled, in an external radial position, that is to say on the external periphery of the ring 35 and of the disk 37.

The fluid flow duct is thus delimited, from the upstream end of the compressor rotor 6 to the downstream end of the freely rotating diffuser 15 or of the bladed diffuser which follows on from it, by surfaces of revolution about the axis X-X, and at the compressor 2, the flow duct is delimited between the fixed casing 3 and the moving surface of the rotor disk 9, while at the plain radial diffuser 15, this duct is delimited by the two walls 34 and 36 which are radial, plain and freely rotating with the ring 35 and the disk 37 which are secured together to rotate as one about the axis X-X. If appropriate, the flow duct is delimited in the bladed diffuser which surrounds the diffuser 15, by two surfaces facing each other which are plane or frustoconical and fixed, secured to the casing 3, and between which profiled fins extend.

The free rotation of the walls 34 and 36 makes it possible to avoid losing, through friction, some of the kinetic energy transmitted to the fluid by the centrifugal disk or wheel 9 of the compressor 2, and the operating rotational speed of the freely rotating ring 35 and disk 37 corresponds to equilibrium between the frictional driving torque due to the drive by the fluid passing through the duct 33 and that trapped between the disk 40 and the wheel 9, and a friction resisting torque due to the braking action exerted by the fluid trapped between the fixed casing 3 and the annular ring 35.

According to one feature specific to the invention, in the plain and freely rotating radial diffuser 15, on the exhaust side of the centrifugal compressor 2, the downstream disk 37 of this diffuser 15 consists of the frontal, toward the upstream end, annular part of a head 39 which is axially widened at the external (with respect to the axis X-X) radial end of an intermediate disk 40 extending radially between the disks 7 and 9 of the turbine 1 and compressor 2 rotors 5 and 6 respectively, this intermediate disk 40 being annular and secured by its radially internal periphery to the external cage of a rolling bearing 41, the internal cage of which surrounds the main shaft 4 coaxially with the latter. The intermediate disk 40 is thus mounted so that it is free to rotate about the axis X-X independently of the main shaft 4 and of the two rotor disks 7 and 9, which are close together but separate and secured to the main shaft 4.

As regards the rotors 5 and 6, this embodiment makes it possible to obtain good compactness while at the same time maintaining the advantages of an embodiment with two separate disks 7 and 9 for the turbine 1 and compressor 2 rotors 5 and 6, it being possible for the compressor disk 9 to be a solid disk made for example of aluminum, so as to limit its inertia, while the turbine disk 7 may be made of steel or ceramic, so that it can withstand the high temperatures and have, between its blades 8, notches produced in the form of apertures made at the periphery of the disk 7 so as to reduce stresses and reduce its inertia, the embodiment with two separate rotor disks 7 and 9 also being favorable from the energy viewpoint because it limits the heat transferred by conduction from the turbine rotor 5 to the compressor rotor 6.

As regards the freely rotating intermediate disk 40, this embodiment is also advantageous because the frontal annular part facing in the downstream direction on the widened head 39 of the intermediate disk 40 constitutes an upstream disk 42 coaxial with the turbine rotor 5 and surrounding this rotor 5, and of which the radial wall 43, which is plain and faces in the downstream direction, constitutes one of the two plane walls of revolution about the axis X-X between which is delimited the radial and annular duct 44 passing through the plain and freely rotating radial nozzle 18 for supplying the centripetal turbine 1. The other of the two walls facing each other and delimiting the duct 44 is the radial plane wall 45 facing in the upstream direction on an annular ring 46 which is also coaxial with the rotor 5 and around the latter, in a chamber of corresponding shape belonging to the casing 3, this ring 46 being secured to the intermediate disk 40 so that it rotates as one therewith by spacer pieces 47 similar to the spacer pieces 38 and therefore substantially axial, profiled, uniformly distributed in the circumferential direction about the axis X-X, and in an external radial position on the ring 46 as on the disk 42.

This then yields an embodiment in which the exhaust diffuser 15 and the inlet nozzle 18 are substantially symmetric with one another with respect to the mid-plane of the intermediate disk 40 perpendicular to the axis X-X. Furthermore, the widened head 39 of the intermediate disk 40 has, in its external radial periphery, a V-shaped notch 48 so as to minimize stresses, the face of the fixed casing 3 facing this having a corresponding V shape.

Producing the compressor 2 plain radial exhaust diffuser 15 and the turbine 1 plain radial inlet nozzle 18 using the two annular rings 35 and 46 secured to the head 39 of the intermediate disk 40 which is free to rotate about the axis X-X makes it possible for the diffuser 15 and the nozzle 18 to be arranged as a combined single unit free to rotate coaxially with respect to the turbine 1 and compressor 2 rotors 5 and 6.

In other words, the novelty of the freely rotating combined unit, the essential component of which is the intermediate disk 40, lies in the fact that the upstream disk 42 of the turbine 1 plain radial inlet nozzle 18 and the downstream disk 37 of the compressor 2 plain radial exhaust diffuser 15 are secured to the intermediate disk 40 so as to rotate as one therewith because they are made as one piece with this disk 40.

Thus, the two rings 35 and 46 make it possible, in combination with the intermediate disk 40 and its widened head 39, both in the case of the centrifugal compressor 2 plain radial diffuser 15 and in the case of the centripetal turbine 1 plain radial nozzle 18, to obtain moving walls which very appreciably reduce the aerodynamic losses through friction between fluids and walls in the two corresponding plain radial ducts 33 and 44, these aerodynamic losses being associated with the fact that there is significant momentum both on the compressor 2 side and on the turbine 1 side. The frictional losses of the disk at the rotors 5 and 6 are also reduced because the intermediate disk 40 is set in free rotation between the rotors 5 and 6. Thus, the combined freely rotating unit made up of the intermediate disk 40 and the associated rings 35 and 46, adopts a rotational speed which corresponds to equilibrium between a driving torque associated with the drive by the fluids passing through the plain radial ducts 33 and 44 of the diffuser 15 and of the nozzle 18 respectively and by the fluids trapped between the walls of the intermediate disk 40 and the walls facing them belonging to the disks 7 and 9 of the rotors 5 and 6, and the resistive torque due to the braking action exerted by the fluids trapped between the annular rings 35 and 46 and the fixed parts of the casing 3 facing them.

As an alternative, the radial duct 44 of the plain nozzle 18 could also be delimited between two walls facing each other of frustoconical shape and free to rotate about the axis X-X downstream of two fixed surfaces of revolution about the axis X-X and facing one another so as to delimit the through-duct of any bladed and fixed nozzle mounted around the plain and freely rotating radial nozzle 18 between the latter and the turbine 1 peripheral inlet volute 17.

Having left the wheel of the centripetal turbine 1 and passed through a short axial transition section 49 of the flow duct, the fluids pass through a radial and annular duct 50 of the turbine 1 plain and freely rotating radial exhaust diffuser 19. Like the radial ducts described earlier, the duct 50 is delimited between two plain walls facing each other and free of blades, which are of revolution about the axis of rotation X-X and may be frustoconical or, as depicted in FIG. 1, plane and radial walls. One of them is a wall 51 facing in the upstream direction on a main or downstream disk 52 coaxial with the turbine rotor 5 and mounted so that it can rotate freely, independently of this rotor 5, about the axis of rotation X-X. This is obtained by the fact that the radial disk 52 is annular and secured, by its internal radial periphery, to one end of another tubular shaft 53 which is guided in rotation coaxially about the axis X-X and in the casing 3 by rolling bearings, one 54 of which is mounted inside the tubular shaft 53 and around a coaxial spindle 55 of a hub 56 also coaxial with the diffuser 19. This hub 56 is substantially symmetric with the hub 29 of the compressor 2 inlet nozzle 14, and this hub 56 also has an external radial surface of revolution about the axis of rotation X-X and with the concave surface facing radially outward and in the upstream direction (toward the blades 8 of the turbine rotor 5) so as, with the wall of the casing 3 facing it, to make a transition between the short axial section of duct 49 and the radial duct 50 of the diffuser 19.

The other wall delimiting this duct 50 is the wall 57 facing in the downstream direction on an upstream annular ring 58 coaxial with the turbine rotor 5 about the axis of rotation X-X and housed in a chamber of corresponding shape belonging to the fixed casing 3. This annular ring 58 is secured to the freely rotating disk 52 by spacer pieces 59 similar to the spacer pieces 47, 38 and 21, that is to say substantially axial, profiled, uniformly distributed in the circumferential direction about the axis X-X and in a radially external position on the ring 58 and the disk 52.

The function of this centripetal turbine 1 plain and freely rotating radial exhaust diffuser 19 is, like that of any known plain diffuser downstream of a turbine rotor, to recuperate some of the kinetic energy of the fluid to increase the efficiency of the turbine 1 and obtain greater power on its shaft 4. Specifically, for a set exhaust pressure, generally equal to atmospheric pressure at the exit of the volute 20 that takes up the flow leaving the radial diffuser 19 or any bladed fixed diffuser which may surround the diffuser 19, between the latter and the volute 20, the increase in pressure in the diffuser 19 makes it possible to lower the static pressure in the outlet section of the turbine rotor 5, this outlet section being situated in the short axial duct section 49, thus making it possible to increase the power available on the turbine 1 shaft 4.

The plain diffuser 19 with radial duct 50 (or axial-radial duct because of the short section of axial duct 49), although being more difficult to produce than a plain axial diffuser, particularly because it makes it necessary to take up the flow leaving through the volute 20, is still much more advantageous than a plain axial diffuser, mainly for the following three reasons.

In the start-up phase, and for non-optimum operation (or operation away from the nominal point), there is residual momentum in the fluid in the outlet section of the turbine rotor 5. Because of the change in radius resulting from the presence of the radial diffuser 19, this diffuser 19 allows the tangential speed in the downstream direction to drop, and therefore allows an increase in the static pressure which is greater than the one observed in an axial diffuser. In particular, during a start-up phase, the torque on the shaft 4 is increased accordingly, and the response time of the turbocompressor is thus shortened.

The second reason is that the reduction in the tangential speed in the radial diffuser 19, followed by the recuperation of fluid by the volute 20, has the significant advantage of leading to a quiet exhaust, unlike the situation encountered with a plain axial diffuser in which the concentration of a swirling flow near to the axis of the machine leads to there being, in this region, a core of inert fluid and unsteady phenomena which are due to shear between the inert fluid and the fluid in swirling flow around the inert fluid, there hence being a not insignificant noise level.

The third reason is that this arrangement makes it possible to design turbomachines with a smaller bulk along the axis of rotation.

In the plain and radial diffuser 19, the free rotation of the walls 51 and 57 delimiting the radial duct 50 further increases the qualities of this radial diffuser 19 because of the reduction in friction between fluids and walls. The result of this is that the efficiency and the power of the centripetal turbine 1 increase further for non-optimum operation and, in particular, at start-up, and that the noise level is lowered still further, this being due to the reduction in the level of turbulence in the diffuser 19.

The materials used for making the nozzle 14 and the diffuser 19 which are radial, plain and free to rotate, respectively on the inlet side of the centrifugal compressor 2 and on the exhaust side of the centripetal turbine 1, are chosen to limit their inertia. As regards the diffuser 19, and bearing in mind the still relatively high gas temperatures at the turbine 1 exhaust, a material of the ceramic type, well able to withstand these temperatures, is advantageously chosen.

In the example of FIG. 1, the turbine 1 and compressor 2 rotors 5 and 6, which are secured together so that they rotate as one by the main shaft 4, are mounted so that they rotate about the axis X-X on journals 60 and 61 coaxial about this axis X-X and each projecting axially on a respective one of the two hubs 56 and 29 which, in this example, may both be fixed, and with the interposition of rolling bearings 62 and 63 between, respectively, the hub of the turbine rotor disk 7 and the journal 60 of the hub 56 in the case of the bearing 62, and between the hub of the compressor rotor disk 9 and the journal 61 of the hub 29, in the case of the bearing 63.

When the turbine is operating as a gas turbine, as depicted in FIG. 2, power output is required from the shaft of the centripetal turbine 1. In this case, the hub 56' of the turbine 1 exhaust diffuser 19 is secured to, so that it rotates as one with, the hub of the centripetal disk 7 of the turbine 1, and therefore with the assembly of the two rotors 5 and 6 which are secured together by the main shaft 4 of the turbocompressor 1. Another rolling bearing 64 is mounted between an external casing 65 which is fixed and secured to the casing 3, and around the spindle 55' of the hub 56', this spindle 55' extending the main shaft 4 and thus being the output shaft of the turbine 1, on which power is available.

For the rest, the structure and operation of the gas turbine of FIG. 2 are the same as in the example of FIG. 1, which means that the same numerical references identify similar members. However, in FIG. 2, the turbine rotor disk 7 is depicted as being made, for example, of ceramic, the compressor rotor disk 9 still being made, for example, of aluminum, as in the example of FIG. 1.

Thanks to all the improvements obtained by reducing friction at the apertures made in the disk 7, at the plain and freely rotating radial nozzles and diffusers, and through which the swirling flow of fluid passes, a gas turbine produced according to the invention may lead to savings of the order of 10 to 15% in specific fuel consumption, all other things being equal.

I claim:

1. A turbomachine comprising at least one of a radial turbine and a centrifugal radial compressor, said turbine comprising a rotor mounted to rotate in a casing about an axis of rotation, the rotor comprising a disk that can rotate about its axis which is coincident with the axis of rotation, and of which a face facing in a downstream direction with respect to a direction of flow of a fluid let into the turbine is fitted with blades, the radial turbine being supplied with fluid by a plain radial inlet nozzle rotating freely and coaxially with respect to the turbine rotor and surrounding the turbine rotor, said centrifugal radial compressor comprising a rotor rotating about said axis of rotation in the casing, the compressor rotor comprising a rotary disk of which a face facing in an upstream direction with respect to the direction of flow of a fluid let into the compressor is equipped with blades compressing the fluid toward a plain radial exhaust diffuser rotating freely, the compressor exhaust diffuser surrounding the compressor rotor and being surrounded by a fluid flow uptake volute wherein a torque to rotate at least one of the plain, freely rotating compressor radial exhaust diffuser and the plain, freely rotating turbine inlet nozzle, is derived from fluid friction from the fluid flow through at least one of said plain, freely rotating compressor radial exhaust diffuser and said plain, freely rotating turbine inlet nozzle.

2. The turbomachine of claim 1, comprising said radial turbine and said centrifugal compressor, wherein said compressor rotor is coaxial and rotating as one with the turbine rotor, said compressor rotor rotary disk being coaxial with the turbine rotor disk, said compressor plain radial exhaust diffuser rotates coaxially with respect to said turbine plain radial inlet nozzle and said fluid flow uptake volute is in communication with a fluid inlet volute surrounding the turbine inlet nozzle.

3. The turbomachine of claim 2, wherein the compressor plain radial exhaust diffuser and the turbine plain radial inlet nozzle are arranged as a single assembly free to rotate coaxially with respect to the turbine and compressor rotors.

4. The turbomachine of claim 3 wherein said freely rotating assembly comprises an intermediate disk mounted so that it is free to rotate between the turbine and compressor rotor disks, about a common main shaft connecting together the turbine and compressor rotor disks so that they rotate as one about the axis of rotation.

5. The turbomachine of claim 1 wherein the compressor plain and freely rotating radial exhaust diffuser has, passing through it, a radial duct delimited between two plain walls facing one another and of revolution about the axis of rotation, and of which one is a wall of a downstream disk coaxial with the compressor rotor and free to rotate about the axis of rotation independently of the compressor rotor, the other wall of the duct being a wall of an upstream annular ring coaxial with the compressor rotor and secured to the downstream disk of said exhaust diffuser so that it rotates as one therewith, by substantially axial spacer pieces in a substantially radially external position, with respect to the axis of rotation, on said upstream annular ring and on said downstream disk.

6. The turbomachine of claim 1 wherein the turbine plain and freely rotating radial inlet nozzle has, passing through it, a radial duct delimited between two plain walls facing one another and of revolution about the axis of rotation, and of which one is a wall of an upstream disk coaxial with the turbine rotor and free to rotate about the axis of rotation independently of the turbine rotor, the other wall of the duct being a wall of a downstream annular ring coaxial with the turbine rotor and secured to the upstream disk of said inlet nozzle so that it rotates as one therewith, by substantially axial spacer pieces in a substantially radially external position, with respect to the axis of rotation on said downstream annular ring and on said upstream disk.

7. The turbomachine of claim 6 wherein, said compressor comprises:
   (a) a rotor comprising a rotary disk coaxial with the turbine rotor and rotating as one with the turbine rotor about the axis of rotation in the casing, and of which a face, facing in an upstream direction with respect to the direction of flow of a fluid let into the compressor, is equipped with blades compressing the fluid toward an exhaust;
   (b) a freely rotating plain radial exhaust diffuser surrounding the compressor's rotor, said freely rotating plain radial exhaust diffuser having, passing through it, a radial duct delimited between two plain walls facing one another and in revolution about the axis of rotation, and of which one is a wall of a downstream disk coaxial with the compressor rotor and free to rotate about the axis of rotation independently of the compressor rotor, the other wall of the duct being a wall of an upstream annular ring coaxial with the compressor rotor and secured to the downstream disk of said exhaust diffuser so that it rotates as one therewith, by substantially axial spacer pieces in a substantially radially external position, with respect to the axis of rotation, on said upstream annular ring and on said downstream disk wherein the freely rotating upstream disk of the turbine plain radial inlet nozzle and the freely rotating downstream disk of the compressor plain radial exhaust diffuser rotate as one with the intermediate disk of the freely rotating assembly, and are of one single piece with said intermediate disk; and
   (c) a fluid flow uptake volute, surrounding the freely rotating plain radial exhaust diffuser, said uptake volute being in communication with a fluid inlet volute surrounding the turbine inlet nozzle, said compressor's plain radial exhaust diffuser and the turbine's plain radial inlet nozzle being arranged as a single assembly, comprising an intermediate disk mounted so that the single assembly is free to rotate coaxially with respect to the turbine and compressor rotors between the turbine and compressor rotor disks about a common main shaft operably connecting the turbine and compressor rotor disks so that they rotate as one about the axis of rotation.

8. The turbomachine of claim 1 wherein a fixed bladed nozzle surrounds the compressor plain and freely rotating radial exhaust diffuser and is surrounded by the fluid flow uptake peripheral volute.

9. The turbomachine of claim 1 wherein a fixed bladed nozzle surrounds the turbine plain and freely rotating radial inlet nozzle and is surrounded by a turbine inlet peripheral volute.

10. The turbomachine of claim 1 wherein the rotor of the radial turbine delivers the fluid to a plain and freely rotating radial exhaust diffuser rotating coaxially with respect to the turbine rotor in said casing.

11. The turbomachine of claim 10 wherein the turbine plain and freely rotating radial exhaust diffuser has, passing through it, a radial duct delimited between two plain walls facing each other and of revolution about the axis of rotation, of which one is a wall of a downstream disk coaxial with the turbine rotor and mounted so that it is free to rotate independently of the turbine rotor about the axis of rotation, rotating as one with a tubular secondary shaft, guided in rotation by at least one bearing about a coaxial hub of the turbine exhaust diffuser, the other wall of the duct being a wall of an upstream annular ring coaxial with the turbine rotor and being secured to the freely rotating downstream disk of the turbine exhaust diffuser so as to rotate as one therewith by substantially axial spacer pieces and in a substantially radially external position on said upstream annular ring and said downstream disk of said turbine exhaust diffuser.

12. The turbomachine of claim 1 wherein the compressor is supplied with fluid by a plain radial nozzle rotating freely and coaxially with respect to the compressor rotor inside said casing.

13. The turbomachine of claim 12, wherein the compressor plain and freely rotating radial inlet nozzle has, passing through it, a radial duct delimited between two plain walls facing each other and of revolution about the axis of rotation, of which one is a wall of an upstream disk coaxial with the compressor rotor and mounted so that it is free to rotate independently of the compressor rotor about the axis of rotation, rotating as one with a tubular shaft, guided in rotation by at least one bearing about a coaxial hub of said compressor inlet nozzle, the other wall of the duct being a wall of a downstream annular ring coaxial with the compressor rotor and being secured to the freely rotating upstream disk of the compressor inlet nozzle so as to rotate as one therewith by substantially axial spacer pieces and in a substantially radially external position on said downstream annular ring and said upstream disk of said compressor inlet nozzle.

14. The turbomachine of claim 12 wherein the compressor plain and freely rotating radial inlet nozzle is surrounded by a fixed radial nozzle with orientable blades.

15. The turbomachine of claim 13 wherein the rotor of the radial turbine delivers the fluid to a plain and freely rotating radial exhaust diffuser rotating coaxially with respect to the turbine rotor in said casing, and wherein the turbine and compressor rotors rotate as one with one another on coaxial journals about the axis of rotation and between the hubs of the turbine plain radial exhaust diffuser and the compressor plain radial inlet nozzle, the plain and freely rotating radial exhaust diffuser comprising:
   (a) a radial duct passing through said plain and freely rotating radial exhaust diffuser;
   (b) two plain walls between which said radial duct is delimited, said two plain walls facing each other and of revolution about the axis of rotation, of which one is a wall of a downstream disk coaxial with the turbine rotor and mounted so that it is free to rotate independently of the turbine rotor about the axis of rotation, rotating as one with a tubular secondary shaft, guided in rotation by at least one bearing about a coaxial hub of the turbine exhaust diffuser, the other wall of the duct being a wall of an upstream annular ring coaxial with the turbine rotor; and (c) a plurality of substantially axial spacer pieces operably securing said upstream annular ring to the freely rotating downstream disk of the turbine exhaust diffuser so as to rotate as one therewith and in a substantially radially external position on said upstream annular ring and said downstream disk of said turbine exhaust diffuser.

16. The turbomachine of claim 13 wherein the rotor of the radial turbine delivers the fluid to a plain and freely rotating radial exhaust diffuser rotating coaxially with respect to the turbine rotor in said casing, and wherein the turbine and compressor rotors rotate as one with the hub of the turbine free radial exhaust diffuser, said diffuser hub being mounted so that it can rotate coaxially about the axis of rotation in the casing via at least one additional bearing, while the turbine and compressor rotors and the turbine plain radial exhaust diffuser rotary hub are mounted so that they rotate on the fixed hub of the compressor plain radial inlet nozzle via a journal coaxial with the axis of rotation, the plain and freely rotating radial exhaust diffuser comprising:

(a) a radial duct passing through said plain and freely rotating radial exhaust diffuser;

(b) two plain walls between which said radial duct is delimited, said two plain walls facing each other and of revolution about the axis of rotation, of which one is a wall of a downstream disk coaxial with the turbine rotor and mounted so that it is free to rotate independently of the turbine rotor about the axis of rotation, rotating as one with a tubular secondary shaft, guided in rotation by at least one bearing about a coaxial hub of the turbine exhaust diffuser, the other wall of the duct being a wall of an upstream annular ring coaxial with the turbine rotor; and (c) a plurality of substantially axial spacer pieces operably securing said upstream annular ring to the freely rotating downstream disk of the turbine exhaust diffuser so as to rotate as one therewith and in a substantially radially external position on said upstream annular ring and said downstream disk of said turbine exhaust diffuser.

* * * * *